Nov. 16, 1926. 1,607,107

E. E. WELLER

FISH LURE MOUTHPIECE

Filed Feb. 11, 1926

Inventor
Erwin E. Weller
By Lynn H. Latta - Atty

Patented Nov. 16, 1926.

1,607,107

UNITED STATES PATENT OFFICE.

ERWIN E. WELLER, OF SIOUX CITY, IOWA.

FISH-LURE MOUTHPIECE.

Application filed February 11, 1926. Serial No. 87,555.

My invention relates to a fish lure of the minnow type, and has for its object to provide a mouthpiece of simple, durable and inexpensive construction, which provides a line tie, an oscillator plate and a depth-regulating fin.

My invention further lies in the construction of the line tie, the fin and the oscillator plate in such relation to each other that they may be formed integrally of a single blank of sheet metal in a very simple operation, which provides at the same time a simple and extremely satisfactory means for attaching the mouthpiece to a wooden minnow, or the like.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

In the accompanying drawings I have shown my invention embodied in a minnow such as that described and illustrated in my companion application Serial No. 756,134, filed December 15, 1924, for a fish lure.

Preferably the minnow comprises a number of sections, 10, 11 and 12, which are hinged together by means of hinges, 13, so as to allow horizontal swinging of the rear sections relative to the forward section.

In such a minnow it is desired that the minnow may be so controlled by the fisherman that it may be pulled through the water at varying depths, either close to the bottom of the body of water, or near the surface thereof. Further, it is desired to give to the forward section an oscillating or wiggling movement which, when transmitted to the rear sections, produces a wiggling similar to that of a live minnow.

My invention provides a mouthpiece adapted to produce all of these functions in addition to providing a line tie.

Figure 5:
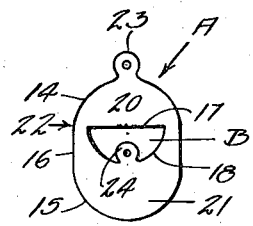
Fig. 5 is a plan view of the blank from which the mouthpiece is formed.
Figure 6:
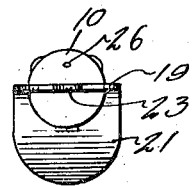
Fig. 6 is a front elevation of the mouthpiece attached to a minnow.

The mouthpiece is formed by stamping the blank, A, shown in Fig. 5, from a sheet of metal. The blank has approximately an elliptical outline, being formed with the semi-circular edges, 14 and 15, joined by straight side edges, 16. In approximately the center of the blank is cut a semi-circular opening, B, having the flat edge, 17, and the curved edge, 18.

The nose of the section, 10, is provided with a horizontal slot, 19, positioned on the axis of the section and extending rearwardly a distance substantially equal to the radius of the curved edge, 14, of the mouthpiece.

The flat edge, 17, of the opening, B, has a length slightly greater than the diameter of the blank, 10, at the rear extremities of the slot, 19, and the radius of the curved edge, 18, is consequently slightly larger than the radius of the blank at that position.

The radius of the edges, 14 and 15, is greater than that of the edges, 18, so that there is formed in the blank the semi-disk fin portion, 20, and the crescent-shaped oscillator portion, 21, which are joined, as at 22, by two narrow necks of material.

On the fin, 20, positioned on the longitudinal axis of the blank is formed an eye or line tie, 23.

Within the slot, B, and formed on the oscillator portion, 21, is a second eye, 24, by means of which the oscillator plate may be attached to the body of the minnow.

Figure 1:
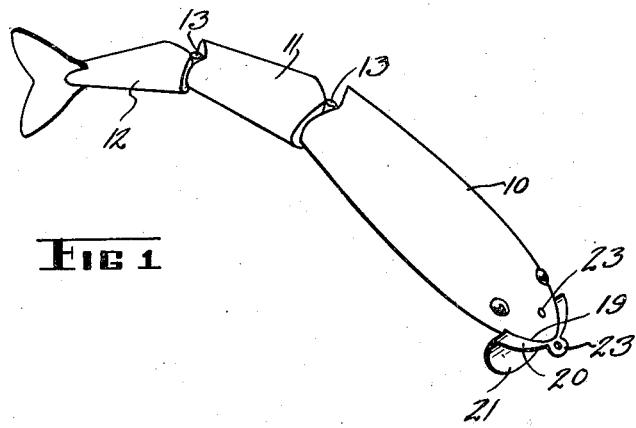
Fig. 1 is a perspective view of a sectional minnow embodying my invention in its mouthpiece.
Figure 2:
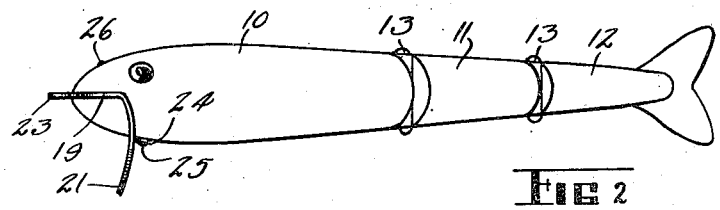
Fig. 2 is a side elevation of the same.
Figure 3:
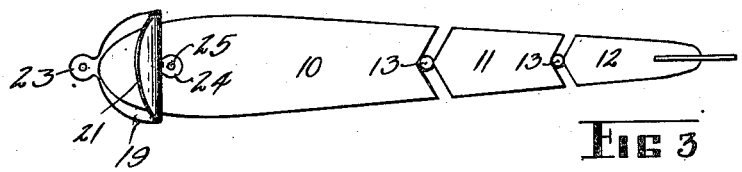
Fig. 3 is an inverted plan of the same.
Figure 4:
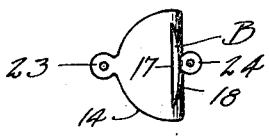
Fig. 4 is a plan view of the mouthpiece.

After the blank has been punched a suitable forming die bends the oscillator portion, 21, in a broad curve, as illustrated in Fig. 2, the upper and lower extremities of which lie substantially in a plane perpendicular to the fin, 20. The eye, 24, is simultaneously bent rearwardly, as illustrated, so that the opening, B, is left unobstructed to receive the portion of the body, 10, below the slot, 19.

The mouthpieces may be formed very quickly and cheaply, and in assembling they are simply slipped over the end of the body, the fin, 20, being received in the slot, 19, as illustrated, a brad, 25, being inserted through the eye, 24, and a second brad, 26, passed through the upper half of the minnow nose and through the fin, 20.

Due to the larger diameter of the fin, 20, a portion of the same will project below the slot, 19, on either side of the minnow body to form a pair of depth-regulating vanes or fins, disposed horizontally of the axis of the body. The alignment of these fins can not be disturbed by contact with objects in the water since the fins are formed of a solid plate passing entirely through the body of the minnow. Likewise, the oscillator plate, 21, is very securely held in position, being integrally united at its upper extremity with the fin, 20, and further secured intermediate of its length to the lower side of the minnow body.

These features of my invention are important inasmuch as the minnow in being towed through seaweed and against obstructions and the like under water, is subjected to very rough usage, and it is desirable that the inclination and position of the various elements of the mouthpiece remain in the exact adjustment originally given them in the factory. Such adjustment may be determined and has been determined by experiment, and the die for producing the mouthpiece so constructed as to give the exact desired relationship between the line tie, the depth-regulating fin and the oscillator plate.

My invention thus achieves uniformity in the relation of these three elements by so constructing them that they may be made integrally and attached to the body of the minnow in only one possible position. That is, when the slot, 19, is cut to the correct depth and in the correct position, and the fin portion, 20, extended to the rear extremity of the slot, the mouthpiece will be in the correct position relative to the body.

The oscillator plate, 21, being somewhat curved, presents a resistance to the water which causes the body section, 10, to wiggle sideways, as is more fully brought out in my companion application.

I find that when the lure is towed very rapidly the ordinary inclined portion of the plate, 21, will tend to drag the lure downwardly in the water. This tendency is resisted by the horizontal fin, 20, which tends to keep the minnow in a course aligned with the tow line. This resisting tendency of the fin, 20, is greater in proportion to the diving action of the plate, 21, when the minnow is being towed relatively slowly, and less when the minnow is being towed more rapidly. Thus the fisherman may control the depth of the minnow to a certain extent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. A fish lure mouthpiece formed of a single blank of metal, comprising a fin portion adapted to be received in a horizontal slot in the nose of the lure and to project laterally on either side thereof, and an oscillator plate formed integrally with said fin portion and bent downwardly from the rear extremity thereof, lying substantially in a plane perpendicular to said fin portion, said oscillator plate having an opening to receive the nose of the lure below said slot.

2. A fish lure mouthpiece formed of a single blank of metal, comprising a fin portion adapted to be received in a horizontal slot in the nose of the lure and to project laterally on either side thereof, an oscillator plate formed integrally with said fin portion and bent downwardly from the rear extremity thereof, lying substantially in a plane perpendicular to said fin portion, said oscillator plate having an opening to receive the nose of the lure below said slot, and a line tie eye formed integrally with the fin at its forward extremity.

3. A fish lure mouthpiece formed of a single blank of metal, comprising a fin portion adapted to be received in a horizontal slot in the nose of the lure and to project laterally on either side thereof, an oscillator plate formed integrally with said fin portion and bent downwardly from the rear extremity thereof, lying substantially in a plane parallel to said fin portion, said oscillator plate having an opening to receive the nose of the lure below said slot, and an eye formed of a portion of metal originally lying within said slot, integral with said oscillator plate and bent rearwardly therefrom to engage the lower surface of the lure body and adapted to receive a brad extended therethrough into the body.

4. A fish lure mouthpiece comprising a fin portion adapted to be received within a horizontal slot in the nose of the lure and to extend laterally beyond the sides thereof, an oscillator plate formed integrally with said fin portion and extended downwardly from the rear extremity thereof, and a line tie eye formed integrally with said fin portion at its forward extremity.

Signed at Sioux City, in the county of Woodbury and State of Iowa this 5th day of February, 1926.

ERWIN E. WELLER.